(12) United States Patent
Park et al.

(10) Patent No.: US 10,384,512 B2
(45) Date of Patent: Aug. 20, 2019

(54) HVAC SYSTEM OF ELECTRIC VEHICLE

(71) Applicants: Hyundai Motor Company, Seoul (KR); Kia Motors Corporation, Seoul (KR)

(72) Inventors: Jae Woo Park, Ansan-si (KR); Sang Shin Lee, Suwon-si (KR); So Yoon Park, Suwon-si (KR); Man Ju Oh, Yongin-si (KR); Jae Woong Kim, Hwaseong-si (KR); So La Chung, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 101 days.

(21) Appl. No.: 15/714,899

(22) Filed: Sep. 25, 2017

(65) Prior Publication Data

US 2018/0281557 A1 Oct. 4, 2018

(30) Foreign Application Priority Data

Mar. 30, 2017 (KR) .......................... 10-2017-0040986

(51) Int. Cl.
*B60H 1/00* (2006.01)
*B60H 1/22* (2006.01)
(Continued)

(52) U.S. Cl.
CPC ..... *B60H 1/00278* (2013.01); *B60H 1/00392* (2013.01); *B60H 1/00485* (2013.01);
(Continued)

(58) Field of Classification Search
CPC  B60H 1/00278; B60H 1/00392; B60H 1/004; B60H 1/00385; B60H 1/00485;
(Continued)

(56) References Cited

U.S. PATENT DOCUMENTS

| 9,459,028 B2 | 10/2016 | Styles et al. |
| 2002/0035972 A1* | 3/2002 | Suzuki ............... B60H 1/00492 123/41.14 |

(Continued)

FOREIGN PATENT DOCUMENTS

KR  10-1448656 B1  10/2014

*Primary Examiner* — Joel M Attey
(74) *Attorney, Agent, or Firm* — Morgan, Lewis & Bockius LLP

(57) ABSTRACT

A heating, ventilation and air conditioning (HVAC) system for an electric vehicle, may include a heating line on which an electric heater and a heating pump are provided; a first heating line connected to the heating line through a main valve, provided with a heater core for indoor heating, and having cooling water flow therethrough to form a first heating channel along with the heating line; a second heating line having one end portion connected to one end portion of the heating line through the main valve and the other end portion connected to the other end portion of the heating line, and having the cooling water flow therethrough to form a second heating channel along with the heating line; and a controller configured for controlling an opening degree of the main valve to control the flow of cooling water of the first heating channel or the second heating channel.

7 Claims, 7 Drawing Sheets

(51) Int. Cl.
*B60L 58/24* (2019.01)
*B60L 1/02* (2006.01)
*B60L 58/26* (2019.01)
*B60L 58/27* (2019.01)

(52) U.S. Cl.
CPC ....... *B60H 1/00885* (2013.01); *B60H 1/2221* (2013.01); *B60L 1/02* (2013.01); *B60L 58/24* (2019.02); *B60L 58/26* (2019.02); *B60L 58/27* (2019.02); *B60H 1/004* (2013.01); *B60H 1/00385* (2013.01); *B60H 2001/00307* (2013.01); *B60H 2001/2253* (2013.01); *B60L 2240/545* (2013.01); *Y02T 10/7005* (2013.01)

(58) Field of Classification Search
CPC .............. B60H 1/00885; B60H 1/2221; B60H 2001/00307; B60H 2001/2253; B60L 58/24; Y02T 10/7005
USPC ........................................................ 165/202
See application file for complete search history.

(56) References Cited

U.S. PATENT DOCUMENTS

| | | | |
|---|---|---|---|
| 2016/0107501 A1 | 4/2016 | Johnston | |
| 2016/0176262 A1* | 6/2016 | Pekarsky | ........... B60H 1/00278 165/104.33 |
| 2018/0178615 A1* | 6/2018 | Xia | ........................ B60L 1/003 |

* cited by examiner

Duty = t/T

HVAC SYSTEM OF ELECTRIC VEHICLE

CROSS REFERENCE TO RELATED APPLICATION

The present application claims priority to Korean Patent Application No. 10-2017-0040986, filed on Mar. 30, 2017, the entire contents of which is incorporated herein for all purposes by this reference.

BACKGROUND OF THE INVENTION

Field of the Invention

The present invention relates to a heating, ventilation and air conditioning (HVAC) system of an electric vehicle, and more particularly, to an HVAC system of an electric vehicle configured for efficiently managing energy required for indoor heating and temperature rise of a battery to extend a mileage.

Description of Related Art

In recent years, an electric vehicle is becoming a social issue for solving problems including realization of environmentally friendly technologies and energy depletion. The electric vehicle is driven by a motor which is supplied with electricity from a battery to output power. Therefore, the electric vehicle has been in the limelight as an environmentally-friendly vehicle because there is no emission of carbon dioxide, noise is little generated, and energy efficiency of a motor is higher than that of an engine.

A core technology for realizing the electric vehicle is the very battery module related technology. Recently, researches into weight reduction, miniaturization and short charging time, or the like of a battery have been actively conducted. The battery module may maintain optimal performance and long service life only when used in an optimal temperature environment. However, the battery module may have difficulty in being used in the optimum temperature environment due to heat generated while driving and a change in outdoor temperature.

In addition, since the electric vehicle does not have a waste heat source generated during combustion by a separate engine like an internal combustion engine, it performs indoor heating using an electric heater during the winter, and since the electric vehicle needs warm-up to improve charge/discharge performance of the battery during the cold weather, it requires a separate electrical cooling water pre-heating system. That is, to maintain the optimum temperature environment of the battery module, the electric vehicle has adopt a technology of operating a cooling and heating system for controlling a temperature of a battery module separately from a cooling and heating system for air conditioning an internal of a vehicle. In other words, two separate cooling and heating systems are constructed. One is used to cool and heat the internal of the vehicle and the other is used to control the temperature of the battery module.

However, when the electric vehicle is driven according to the method as described above, energy may not be efficiently managed and therefore a mileage is short, such that the electric vehicle may not drive a long distance, and a mileage is reduced by about 30% for cooling during the summer and is reduced by 40% or more for heating during the winter, and therefore the electric vehicle has a more severe heating problem during the winter which has not been a problem in the internal combustion engine. The existing system for cooling/warming-up a battery for an electric vehicle uses indoor air to perform cooling by operating an air conditioner and perform warm-up by operating a heater. However, the existing system has the increased power consumption during the cooling/warm-up and requires a larger space between battery cells when performing the cooling/warm-up of the battery using air than when performing the cooling/warm-up of the battery using a liquid fluid (cooling water) and therefore further increases a package space and a weight, such that the existing system has a limitation in increasing the number of cells. In addition, an air temperature gradually rises while air passes through the battery cell, and therefore a temperature deviation between an inlet cell and an outlet cell becomes severe, such that the existing system may have trouble operating the battery at a maximum efficiency.

Therefore, when there is a need to increase the temperature of the battery, the temperature of the cooling water rises by the separate electric device to warm-up the battery, maintaining the temperature of the battery at 38 to 42° C. so that the battery is operated at optimal efficiency. However, the electric heater for indoor heating and the electric heater for increasing the temperature of the battery are separately applied, which leads to increase costs and waste a lot of energy during the heater operation.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an HVAC system of an electric vehicle configured for efficiently managing energy required for indoor heating of the vehicle and increasing a temperature of a battery to extend a mileage and to reduce a production cost.

According to an exemplary embodiment of the present invention, there is provided an HVAC system for an electric vehicle, including: a heating line on which an electric heater and a heating pump are provided; a first heating line having one end portion connected to one end portion of the heating line through the main valve and the other end portion connected to the other end portion of the heating line, provided with a heater core for indoor heating, and having cooling water flow therethrough to form a first heating channel along with the heating line; a second heating line having one end portion connected to one end portion of the heating line through the main valve and the other end portion connected to the other end portion of the heating line, exchanging heat with the high voltage battery, and having the cooling water flow therethrough to form a second heating channel along with the heating line; and a controller configured for controlling an opening degree of the main valve to control the flow of cooling water of the first heating channel 610 or the second heating channel, On the first heating line, a first water temperature detector may be provided at a point upstream of the heater core based on the flow of the cooling water and the controller may control an operation of the electric heater based on a measured value of the first water temperature sensor.

When a measured value of the first water temperature detector is equal to or greater than a first reference value, the controller may reduce an operation amount of the electric heater.

On the second heating line, a second water temperature detector may be provided at an upstream point of a portion exchanging heat with the high voltage battery based on the flow of the cooling water and the controller may control an opening degree of the main valve based on a measured value of the second water temperature sensor.

When the measured value of the second water temperature detector is equal to or greater than a second reference value, the controller may control the opening degree of the main valve so that a flux of the cooling water flowing into the second heating channel is an inverse proportion to the measured value of the second water temperature sensor.

The HVAC system for an electric vehicle may further include: a cooling line including a radiator and a cooling pump and having the cooling water flow therethrough to exchange heat with electrical equipment, in which the cooling line may be connected to the second heating line in parallel.

A point where the cooling line is connected to the second heating line may be provided with a separation line to separately circulate the cooling water by separating the cooling line from the second heating line.

A point where the cooling line and the second heating line are connected in parallel may be provided with a first auxiliary valve, a point where the separation line is separated from the cooling line may be provided with a second auxiliary valve, and the controller may control the first auxiliary valve and the second auxiliary valve so that the cooling line and the second heating line have the cooling water separately flow therethrough or have the cooling water simultaneously flow therethrough.

The controller may control the first and second auxiliary valves so that the cooling water separately flows into the second heating line when the high voltage battery is heated and the cooling water may simultaneously flow in the cooling line and the second heating line when the high voltage battery is cooled.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
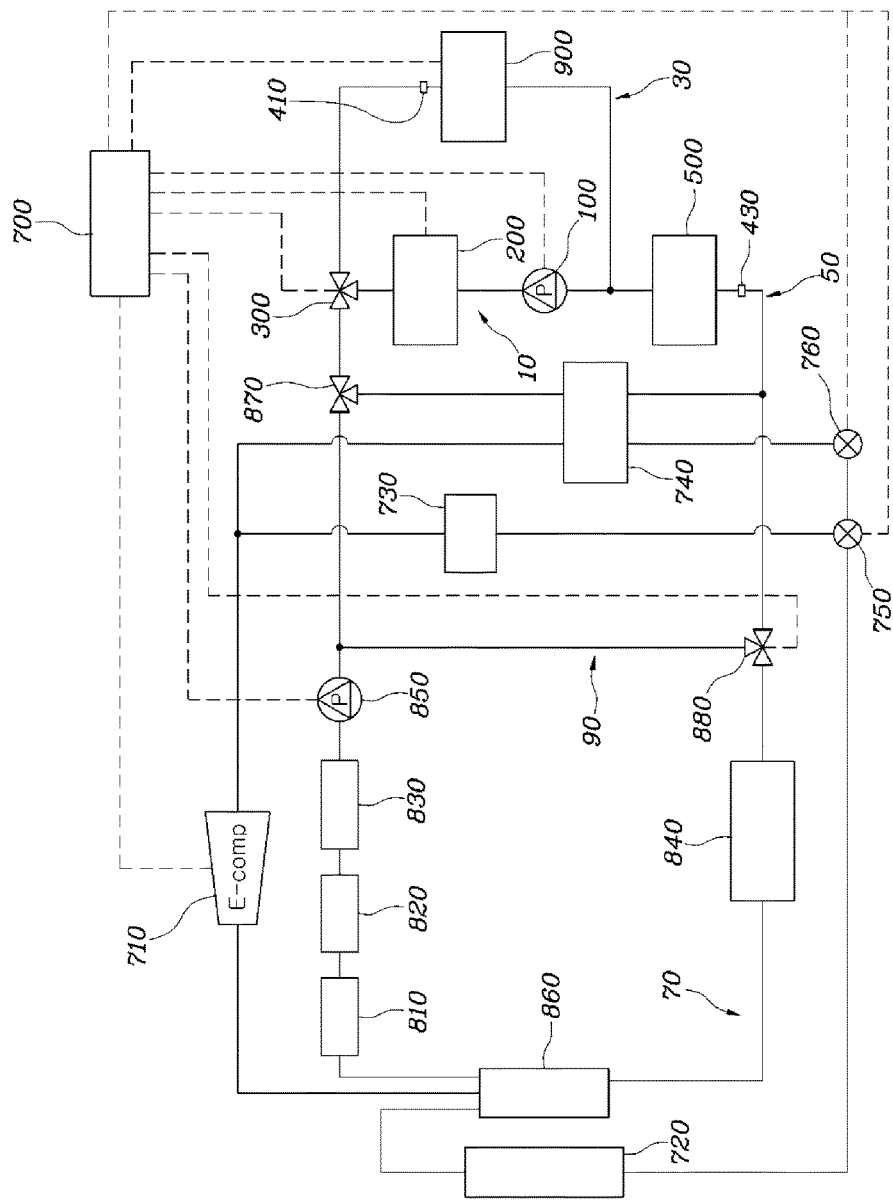
FIG. 1 is a diagram illustrating an HVAC system for an electric vehicle according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an HVAC system for an electric vehicle according to an exemplary embodiment of the present invention will be described with reference to the accompanying drawings.

Figure 2:
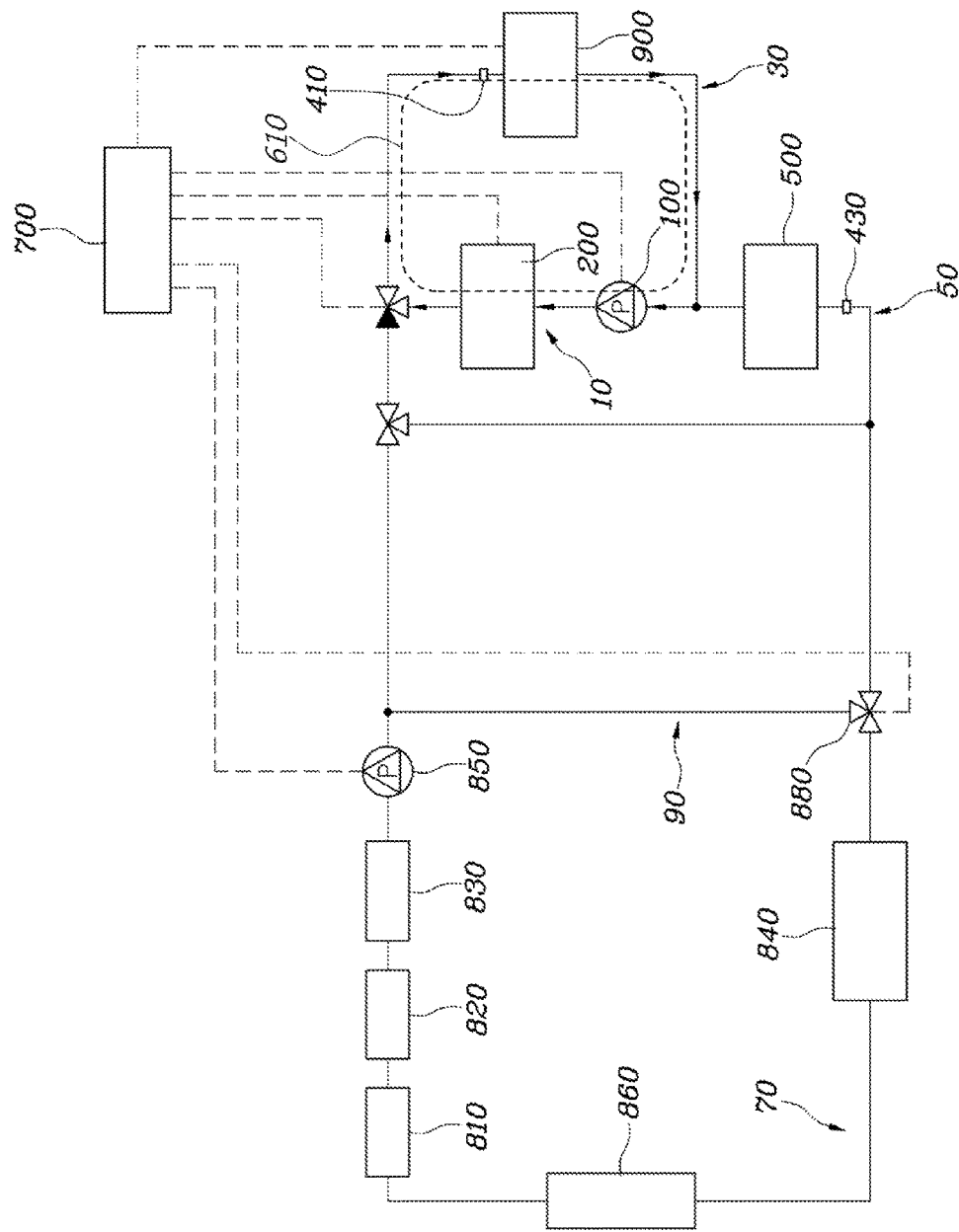
FIG. 2 is a diagram illustrating a case where indoor heating of FIG. 1 is performed.
Figure 3:
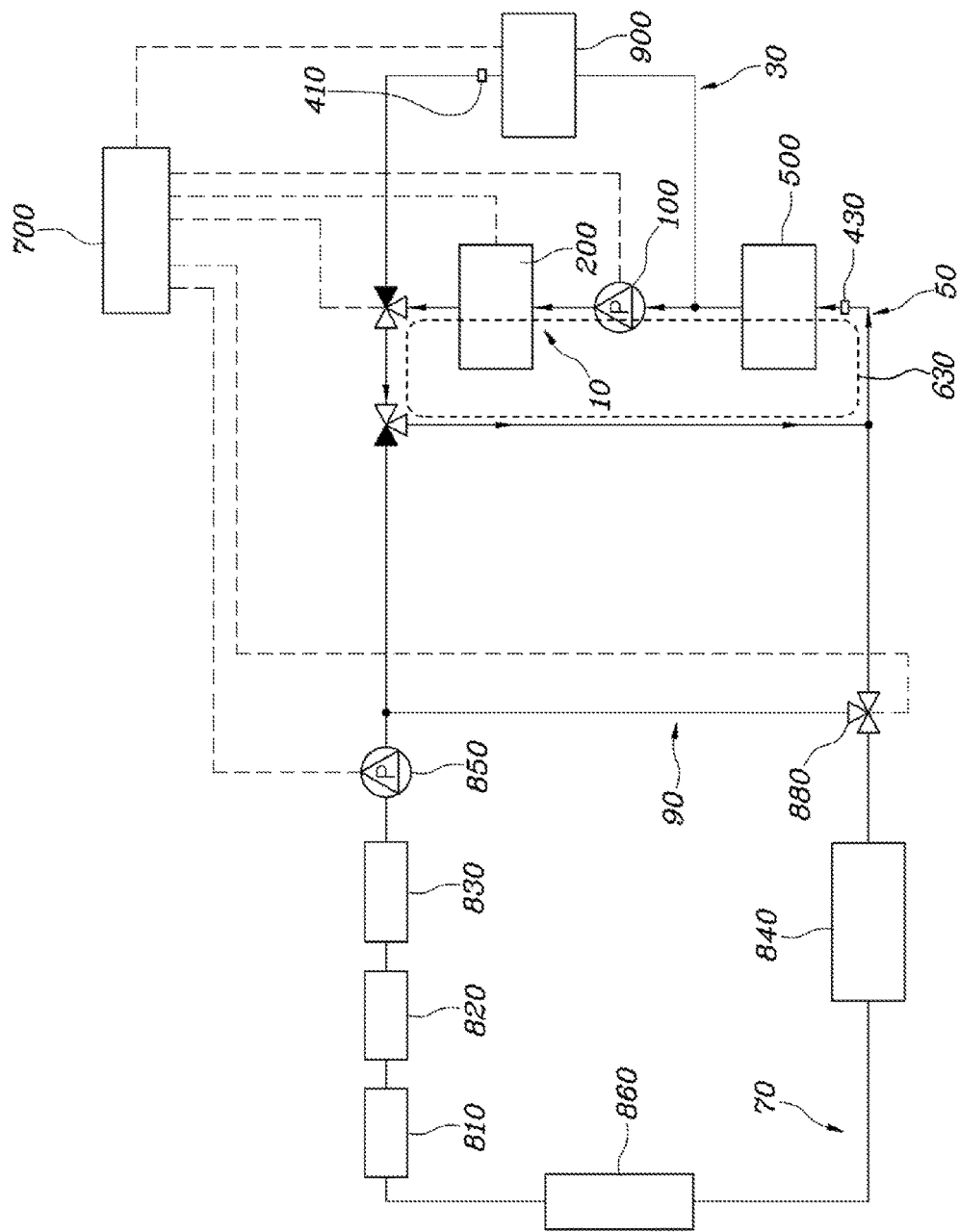
FIG. 3 is a diagram illustrating a case where temperature rise of a battery of FIG. 1 is performed.
Figure 4:
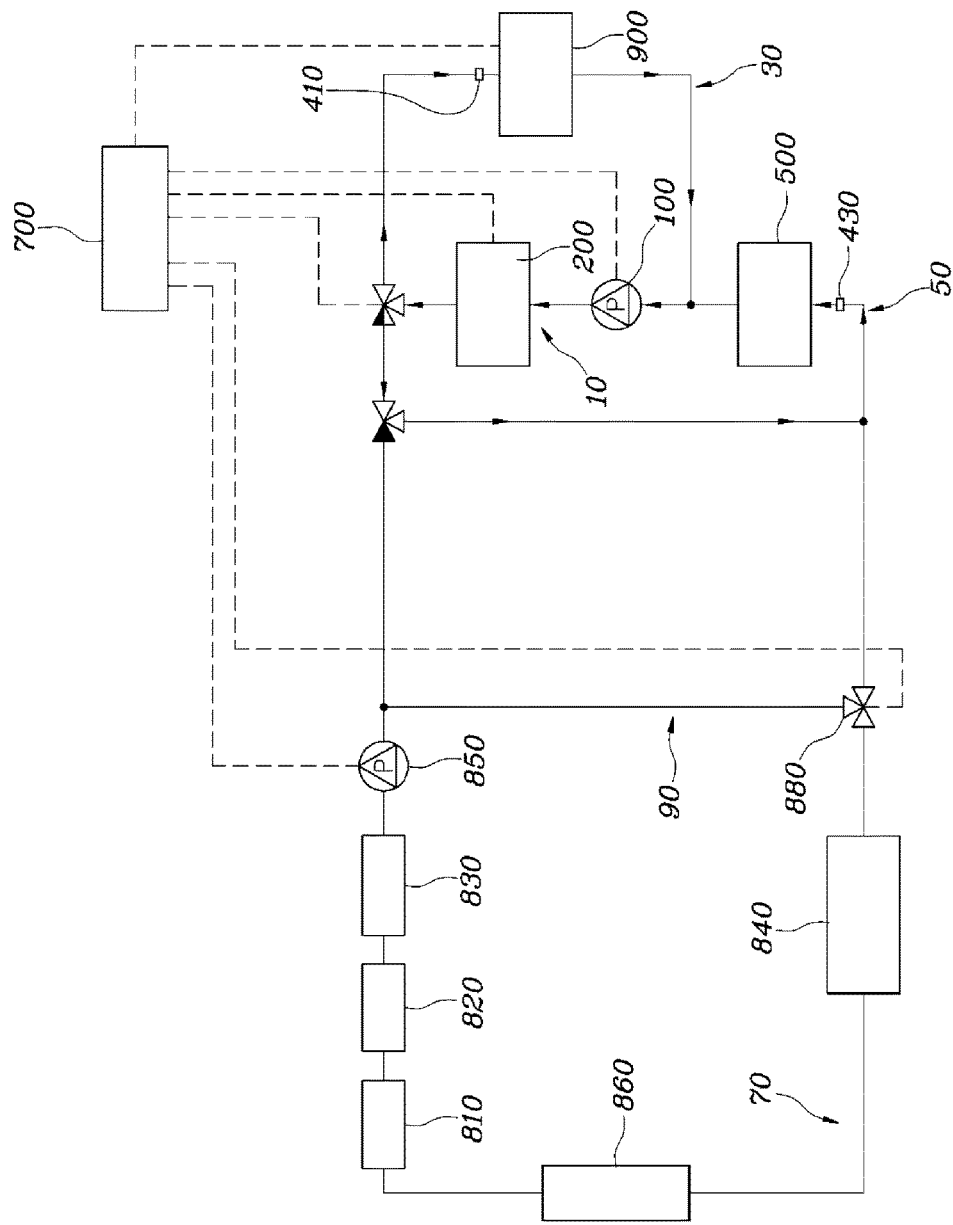
FIG. 4 is a view illustrating a case where the indoor heating and the temperature rise of the battery of FIG. 1 are performed simultaneously.
Figure 5:
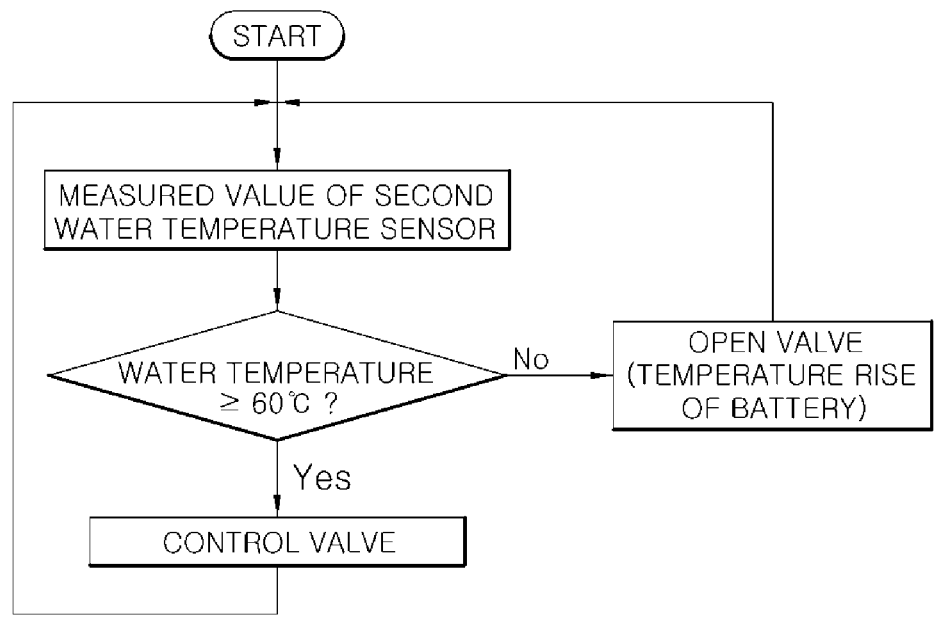
FIG. 5, FIG. 6 and FIG. 7 are diagrams illustrating a method of controlling an opening degree of a main valve.
Figure 6:
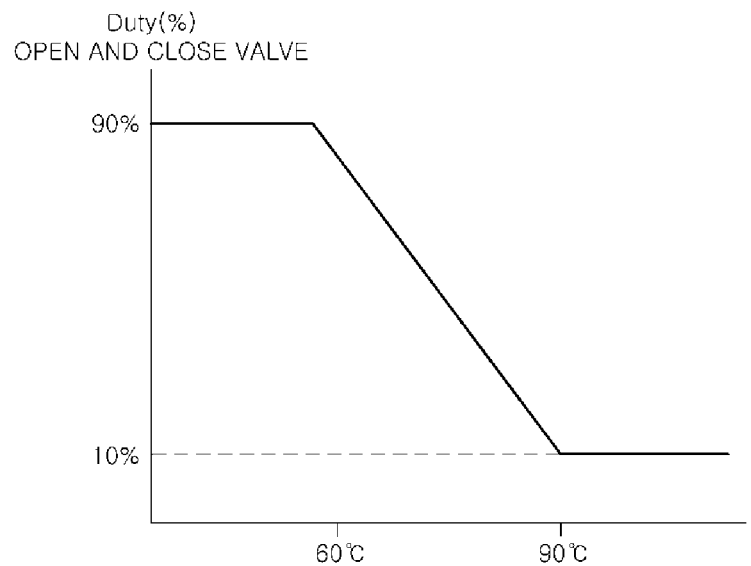
Figure 7:
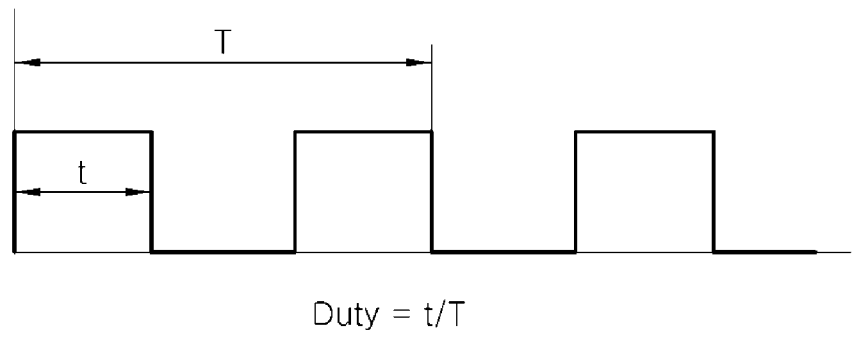
Figure 8:
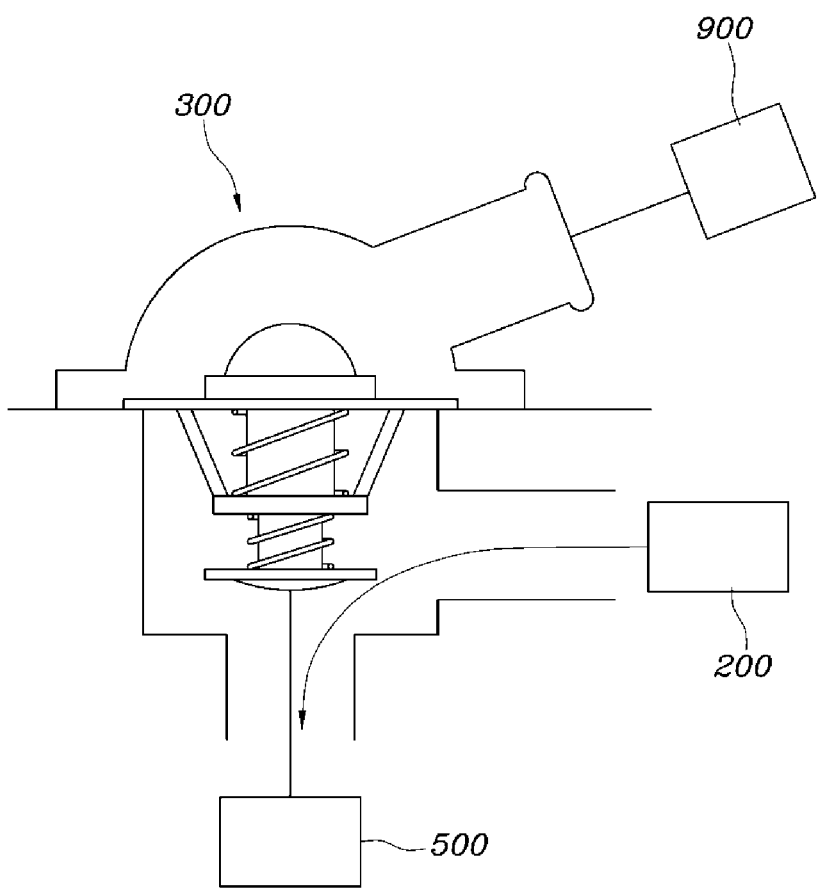
FIG. 8 and FIG. 9 are diagrams illustrating an operation when a thermostat is applied to the main valve.
Figure 9:
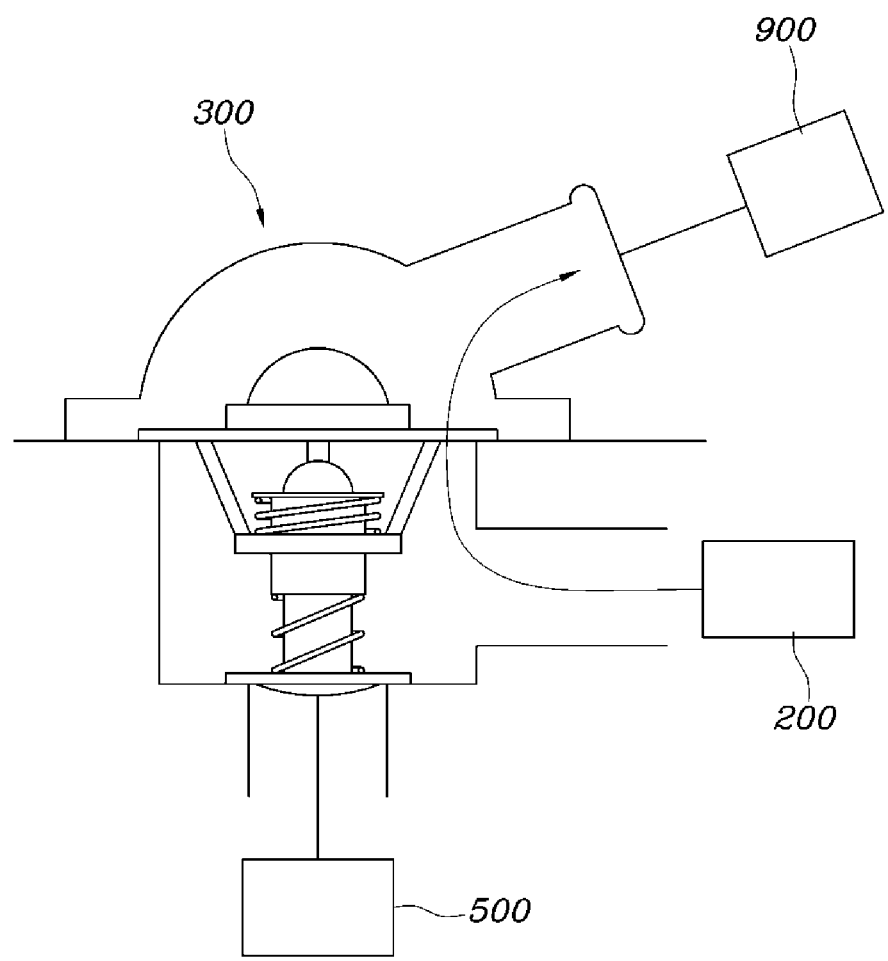

FIG. 1 is a diagram illustrating an HVAC system for an electric vehicle according to an exemplary embodiment of the present invention, FIG. 2 is a diagram illustrating a case where indoor heating of FIG. 1 is performed, FIG. 3 is a diagram illustrating a case where temperature rise of a battery of FIG. 1 is performed, and FIG. 4 is a view illustrating a case where the indoor heating and the temperature rise of the battery of FIG. 1 are performed simultaneously. FIG. 5, FIG. 6 and FIG. 7 are diagrams illustrating a method of controlling an opening degree of a main valve and FIG. 8 and FIG. 9 are diagrams illustrating an operation when a thermostat is applied to the main valve.

As illustrated in FIG. 1, a refrigerant line according to an exemplary embodiment of the present invention in which a refrigerant is circulated may be formed like before. The refrigerant line may be used when only a radiator 860 is insufficient to cool an internal of a vehicle or cool a high voltage battery because of high outdoor environment temperature. The refrigerant line may include an electronic compressor 710, a condenser 720, an evaporator 730, a battery chiller 740, and valves 750 and 760 for selectively flowing a refrigerant. The detailed description of the refrigerant line is well-known in the art and therefore will be omitted herein Herein, a heating line for indoor heating and temperature rise of a battery will be mainly described with reference to FIGS. 1 to 4. An HVAC system for an electric vehicle according to an exemplary embodiment of the present invention includes a heating line 10 on which an electric heater 200 and a heating pump 100 are provided; a first heating line 30 having one end portion connected to one end portion of the heating line 10 through the main valve 300 and the other end portion connected to the other end portion of the heating line 10; a heater core 900 for indoor heating, and having cooling water flow therethrough to form a first heating channel 610 along with the heating line 10; a second heating line 50 having one end portion connected to one end portion of the heating line 10 through the main valve 300 and the other end portion connected to the other end portion of the heating line 10, exchanging heat with the high voltage battery 500, and having the cooling water flow therethrough to form a second heating channel 630 along with the heating line 10; and a controller 700 controlling an opening degree of the main valve 300 to control the flow of cooling water of the first heating channel 610 or the second heating channel 630.

First, describing the heating line 10, the heating line 10 is provided with the electric heater 200 and the heating pump 100. In the figure, the heating pump 100 is located on an upstream side and the electric heater 200 is located on a downstream side. However, the arrangement order is not limited thereto. The electric heater 200 heats the cooling water and the heated cooling water is supplied to the first heating line 30 or the second heating line 50 by the main valve 300 to form the first heating channel 610 or the second heating channel 630.

One end portion of the first heating line 30 is connected to one end portion of the heating line 10 through the main valve 300 and the other end portion is connected to the other end portion of the heating line 10. Further, a heater core 900 for indoor heating is provided. Therefore, the first heating line 30 has cooling water flow therethrough to form the first heating channel 610 together with the heating line 10, such that the cooling water heated by the electric heater 200 during the indoor heating is exchanged with heat through the heater core 900 to perform the indoor heating. The indoor heating is mainly performed by battery power when the vehicle is travelling. At this time, the temperature of the cooling water required for the heater core 900 is 60 to 90° C. Accordingly, the controller 700 controls the operation of the electric heater 200 to keep the temperature of the cooling water in a range of 60 to 90° C. The main valve 300 is controlled by the controller 700 to open the side of the heating line 10 and the side of the first heating line 30. The content is illustrated in FIG. 2.

One end portion of the second heating line 50 is connected to one end portion of the heating line 10 through the main valve 300 and the other end portion is connected to the other end portion of the heating line 10. Further, the second heating line 50 is provided with the high voltage battery 500 to perform heat exchange. The high voltage battery 500 may be formed so that the cooling water flows around the heat exchanger 500 upon the heat exchange to exchange heat with the high voltage battery 500 and the high voltage battery 500 may be supplied with hot air/cold air of the cooling water through a blower, or the like to perform the heat exchange. The second heating line 50 has the cooling water flow therethrough to form the second heating channel 630 together with the heating line 10, such that the cooling water heated by the electric heater 200 is supplied to the high voltage battery 500 when the temperature rise of the high voltage battery 500 is performed and exchanges heat with the high voltage battery 500 to perform the temperature rise of the high voltage battery 500. The case where the temperature rise of the battery is required corresponds to the use of an external power supply including parking conditions when the high voltage battery 500 is charged during the cold weather. To improve the charging/discharging performance of the high voltage battery 500, the temperature rise of the battery is required. At this time, the temperature of the cooling water required for the high voltage battery 500 is 40 to 90° C. Therefore, the controller 700 controls the operation of the electric heater 200 to keep the temperature of the cooling water in a range of 40 to 60° C. The main valve 300 is also controlled by the controller 700 to open the side of the heating line 10 and the side of the second heating line 50. The content is illustrated in FIG. 3.

FIG. 4 illustrates the case where the indoor heating and the temperature rise of the battery are performed simultaneously. Therefore, in FIG. 4, both of FIG. 2 and FIG. 3 are performed. That is, the electric heater 200 of the heating line 10 is heated to increase the temperature of the cooling water and supply the heated cooling water to both of the first heating line 30 and the second heating line 50 through the main valve, such that the first heating channel 610 and the second heating channel 630 are formed. Accordingly, the controller 700 controls the main valve 300 to open all the heating line 10 side, the first heating line 30 side, and the second heating line 50 side.

However, the cooling water supplied to the high voltage battery 500 side needs to regulate a temperature of an inlet side of the high voltage battery 500 to be 60° C. or less, preventing damage due to cell overheating and the heater core 900 needs the cooling water ranging from 60 to 90° C. Therefore, in an exemplary embodiment of the present invention, the control to satisfy the two conditions is performed.

First, on the first heating line 30, a first water temperature detector 410 is provided at a point upstream of the heater core 900 based on the flow of the cooling water. Therefore, the controller 700 controls the operation of the electric heater 200 based on a measured value of the first water temperature detector 410. That is, after the first water temperature detector 410 measures the temperature of the cooling water and the controller 700 checks that the measured value of the first water temperature detector 410 is equal to or greater than a first reference value and when the measured value of the first water temperature detector 410 is equal to or more than 90° C., the controller 700 reduces the operation amount of the electric heater 200. Further, when the measured value of the first water temperature detector 410 is equal to or less than 60° C., the operation amount of the electric heater 200 is increased so that the measured value of the first water temperature detector 410 is within the range of 60 to 90° C.

Further, on the second heating line 50, a second water temperature detector 430 is provided at an upstream point of a portion exchanging heat with the high voltage battery 500 based on the flow of the cooling water. Therefore, the controller 700 controls the opening degree of the main valve 300 based on a measured value of the second water temperature detector 430. That is, after the second water temperature detector 430 measures the temperature of the cooling water and the controller 700 checks whether the measured value of the second water temperature detector 430 is equal to or more than a second reference value, when the measured value of the second water temperature detector 430 is equal to or more than 60° C., the opening degree of the main valve 300 is controlled so that the flux of the cooling water flowing into the second heating channel 630 is an inverse proportion to the measured value of the second water temperature detector 430 (FIG. 6). The contents are shown in FIG. 5, FIG. 6 and FIG. 7, and the opening and closing or the opening and closing time of the main valve 300 may be controlled by duty as illustrated in FIG. 7.

In the drawings of the present invention, the high voltage battery 500 is positioned close to the upstream point of the heating pump 100. The reason is that when the indoor heating and the temperature rise of the battery are performed simultaneously, the high voltage battery 500 is located from the electric heater 200 as far away as possible to allow the cooling water whose temperature has been risen by the electric heater 200 to naturally radiate heat while the cooling water moves to the high voltage battery 500, allowing the temperature of the cooling water to be lower than the allowed temperature for the high voltage battery 500. Therefore, the position of the high voltage battery 500 is not limited to the above position and therefore may be changed depending on the design or environment as much as you want.

In addition, as illustrated in FIGS. 8 to 9, the main valve 300 may be a thermostat. As the thermostat, a wax pellet type in which a case is sealed with wax is used. The wax pellet type pushes a knittle using the principle that the wax expands when it is melted and opens the valve. Normally, an open valve temperature of 55 to 60° C. is applied, and thus the thermostat closes an upper water channel when the cooling water is equal to or less than 60° C. and opens an upper valve when the temperature is equal to or more than 60° C., such that the thermostat is used as a heat source for the indoor heating. Therefore, the thermostat may be applied to the main valve 300 for controlling the second heating line 50 requiring the cooling water equal to or less than 60° C.

The HVAC system for an electric vehicle of the present invention further includes a cooling line 70 that includes a radiator (860) and a cooling pump (850) and has cooling water flow therethrough to exchange heat with electrical equipment. The cooling line 70 is connected to the second heating line 50 in parallel. The electric component may include an on board charger (OBC) 810, a motor 820, an electric power controller (EPCU) 830, and the like. Further, the electric component may preferably include a reservoir tank 840 as well. Therefore, the electrical component is cooled by the cooling line while the vehicle drives. Further, when even the high voltage battery 500 needs to be cooled, it may be heat-exchanged by the cooling line 70 to be cooled.

A point where the cooling line 70 is connected to the second heating line 50 is provided with a separation line 90 to separately circulate the cooling water by separating the cooling line 70 from the second heating line 50. Further, a point where the cooling line 70 and the second heating line 50 are connected in parallel is provided with a first auxiliary valve 870 and a point where the separation line 90 is separated from the cooling line 70 is provided with a second auxiliary valve 880. Therefore, the controller 700 controls the opening degree of the first auxiliary valve 870 and the second auxiliary valve 880 so that the cooling line 70 and the second heating line 50 have the cooling water separately flow therethrough or have the cooling water simultaneously flow therethrough, simultaneously or separately cooling the electric component and the high voltage battery 500.

That is, the controller 700 controls the first and second auxiliary valves 870 and 880 so that the cooling water separately flows into the second heating line 50 when the high voltage battery 500 is heated and the separated cooling line 70 is continuously supplied with the cooling water by forming a closed circuit by the separation line 90 to cool the electrical component. On the other hand, when the high voltage battery 500 is cooled, the cooling water is not supplied to the separation line 90 but the cooling water is supplied to the cooling line 70 and the second heating line 50 to be circulated together. At the present time, since the electric heater 200 is not operated, even when the cooling water flows, the high voltage battery 500 is not heated and therefore may be cooled.

Therefore, according to the HVAC system for an electric vehicle according to the exemplary embodiment of the present invention, when the heat exchange of the high voltage battery 500 and the indoor heating are performed, only one electric heater 200 is provided and commonly used, extending the mileage of the vehicle and saving the production cost while effectively managing the energy.

According to the HVAC system for an electric vehicle as described above, only one electric heater may be used commonly in performing the heat exchange of the high voltage battery and the indoor heating, extending the mileage of the vehicle and saving the production cost while efficiently managing the energy.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A heating, ventilation and air conditioning (HVAC) system for an electric vehicle, the HVAC comprising:
   a heating line on which an electric heater and a heating pump are provided;
   a first heating line having a first end portion connected to a first end portion of the heating line through a main valve and a second end portion connected to a second end portion of the heating line, provided with a heater core for indoor heating, and having cooling water flow therethrough to form a first heating channel along with the heating line;
   a second heating line having a first end portion connected to a first end portion of the heating line through the main valve and a second end portion connected to a second end portion of the heating line, exchanging heat with a battery, and having the cooling water flow therethrough to form a second heating channel along with the heating line;
   a controller configured for controlling an opening degree of the main valve to control the flow of the cooling water of the first heating channel or the second heating channel,
   wherein on the second heating line, a second water temperature detector is provided at an upstream point of a portion exchanging ire at wish the high voltage battery based on the flow of the cooling water and the controller is configured to control an opening, degree of the main valve based on a measured value of the second water temperature sensor, and
   wherein, when the measured value of the second water temperature detector is equal to or greater than a first reference value, the controller is configured to control the opening degree of the main valve wherein a flux of the cooling water flowing into the second heating channel is an inverse proportion to the measured value of the second water temperature sensor.

2. The HVAC system for the electric vehicle of claim 1, wherein on the first heating line, a first water temperature detector is provided at a point upstream of the heater core based on the flow of the cooling water and the controller is configured to control an operation of the electric heater based on a measured value of the first water temperature sensor.

3. The HVAC system for the electric vehicle of claim 2, wherein, when the measured value of the first water temperature detector is equal to or greater than a second reference value, the controller is configured to reduce an operation amount of the electric heater.

4. The HVAC system for the electric vehicle of claim 1, further including:
   a cooling line including a radiator and a cooling pump and having the cooling water flow therethrough to exchange heat with electrical equipment, wherein the cooling line is connected to the second heating line in parallel.

5. The HVAC system for the electric vehicle of claim 4, wherein a point where the cooling line is connected to the second heating line is provided with a separation line to separately circulate the cooling water by separating the cooling line from the second heating line.

6. The HVAC system for the electric vehicle of claim 5, wherein a point where the cooling line and the second heating line are connected in parallel is provided with a first auxiliary valve, a point where the separation line is separated from the cooling line is provided with a second auxiliary valve, and the controller is configured to control the first auxiliary valve and the second auxiliary valve wherein the cooling line and the second heating line have the cooling water separately flow therethrough or have the cooling water simultaneously flow therethrough.

7. The HVAC system for the electric vehicle of claim 6, wherein the controller is configured to control the first and second auxiliary valves wherein the cooling water separately flows into the second heating line when the battery is heated and the cooling water simultaneously flows into the cooling line and the second heating line when the battery is cooled.

* * * * *